US010480591B2

(12) United States Patent
Kundermann

(10) Patent No.: US 10,480,591 B2
(45) Date of Patent: Nov. 19, 2019

(54) COUPLING ARRANGEMENT FOR THE POWERTRAIN OF A VEHICLE

(71) Applicant: ZF Friedrichshafen AG, Friedrichshafen (DE)

(72) Inventor: Wolfgang Kundermann, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 350 days.

(21) Appl. No.: 15/426,300

(22) Filed: Feb. 7, 2017

(65) Prior Publication Data

US 2017/0227068 A1   Aug. 10, 2017

(30) Foreign Application Priority Data

Feb. 8, 2016   (DE) .................. 10 2016 201 869

(51) Int. Cl.

| | |
|---|---|
| *F16D 25/0635* | (2006.01) |
| *F16D 13/40* | (2006.01) |
| *F16D 13/69* | (2006.01) |
| *F16D 25/0638* | (2006.01) |
| *F16D 25/12* | (2006.01) |

(Continued)

(52) U.S. Cl.
CPC ......... *F16D 25/0635* (2013.01); *F16D 13/40* (2013.01); *F16D 13/69* (2013.01); *F16D 25/0638* (2013.01); *F16D 25/123* (2013.01); *F16D 3/12* (2013.01); *F16D 2300/0214* (2013.01); *F16H 45/02* (2013.01)

(58) Field of Classification Search
None
See application file for complete search history.

(56) References Cited

U.S. PATENT DOCUMENTS 5,328,008 A * 7/1994 Sano ................... F16D 25/0638
                                              188/259
5,411,123 A * 5/1995 Rej ..................... F16D 25/0638
                                              192/106 F (Continued)

FOREIGN PATENT DOCUMENTS

| DE | 3222119 | 10/1983 |
|---|---|---|
| DE | 10109497 | 8/2002 |

(Continued)

*Primary Examiner* — Jacob S. Scott
(74) *Attorney, Agent, or Firm* — Cozen O'Connor

(57) ABSTRACT

A coupling arrangement for the powertrain of a vehicle with a clutch housing with a feed arrangement for feed medium contained in the clutch housing and with a clutch mechanism, wherein the clutch mechanism has input-side clutch units communicating with an input-side clutch unit carrier, output-side clutch units communicating with an output-side clutch unit carrier, and a pressing device through which an operative connection between the input-side clutch units and the output-side clutch units can be produced or cancelled, and wherein the input-side clutch unit carrier is part of the feed arrangement. The feed arrangement further has a feed device which is associated with the input-side clutch unit carrier and which is connected to the input-side clutch unit carrier and/or to the pressing device so as to be fixed with respect to relative rotation.

14 Claims, 9 Drawing Sheets

(51) Int. Cl.
*F16H 45/02* (2006.01)
*F16D 3/12* (2006.01)

(56) References Cited

U.S. PATENT DOCUMENTS

| | | | |
|---|---|---|---|
| 6,523,657 B1* | 2/2003 | Kundermann | F16D 21/06 |
| | | | 192/107 M |
| 6,929,105 B2 | 8/2005 | Sasse | |
| 8,261,900 B2 | 9/2012 | Degler | |
| 8,534,440 B2 | 9/2013 | Sudau | |
| 2005/0217962 A1* | 10/2005 | Pedersen | F16D 25/0638 |
| | | | 192/85.25 |
| 2006/0207851 A1* | 9/2006 | Heuler | F16H 45/02 |
| | | | 192/3.3 |
| 2006/0260901 A1* | 11/2006 | Sawayanagi | F16D 25/0638 |
| | | | 192/85.39 |
| 2007/0000747 A1* | 1/2007 | Miyazaki | F16D 13/648 |
| | | | 192/70.12 |
| 2007/0295572 A1* | 12/2007 | Samie | F16H 45/02 |
| | | | 192/3.3 |
| 2008/0173512 A1* | 7/2008 | Kaneko | F16H 45/02 |
| | | | 192/3.29 |
| 2013/0175131 A1* | 7/2013 | Iwashita | F16H 41/30 |
| | | | 192/3.29 |
| 2015/0008089 A1 | 1/2015 | Schroder | |

FOREIGN PATENT DOCUMENTS

| | | |
|---|---|---|
| DE | 102009016414 | 10/2009 |
| DE | 102009051223 | 5/2010 |
| DE | 102012201510 | 8/2013 |
| GB | 2121918 | 1/1984 |

\* cited by examiner

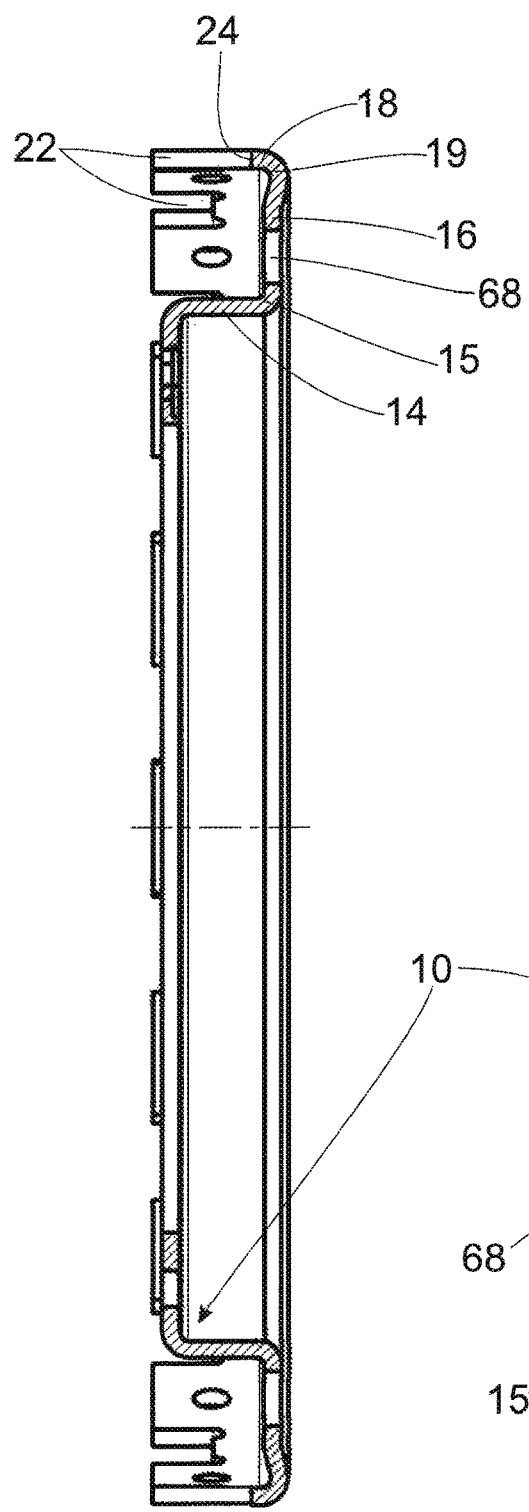
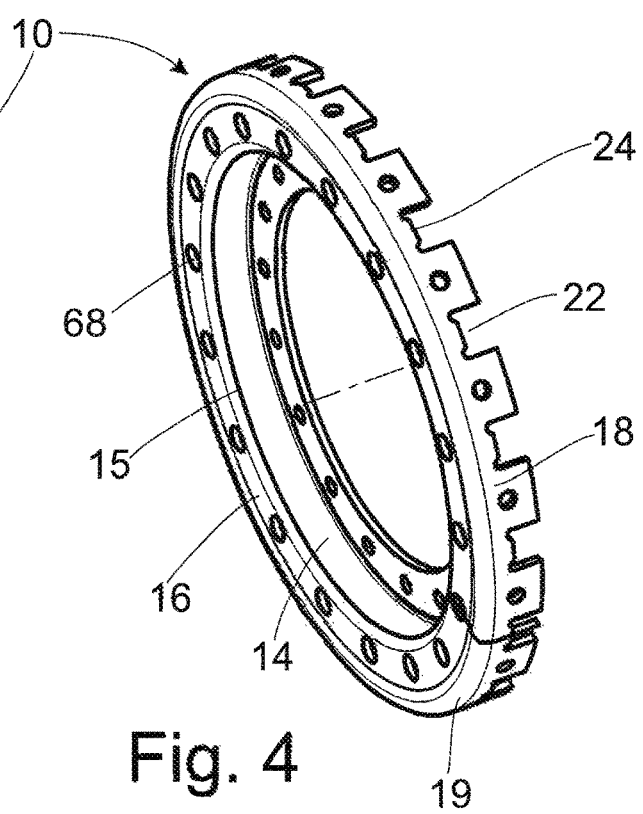
Fig. 3
Fig. 4

Fig. 9
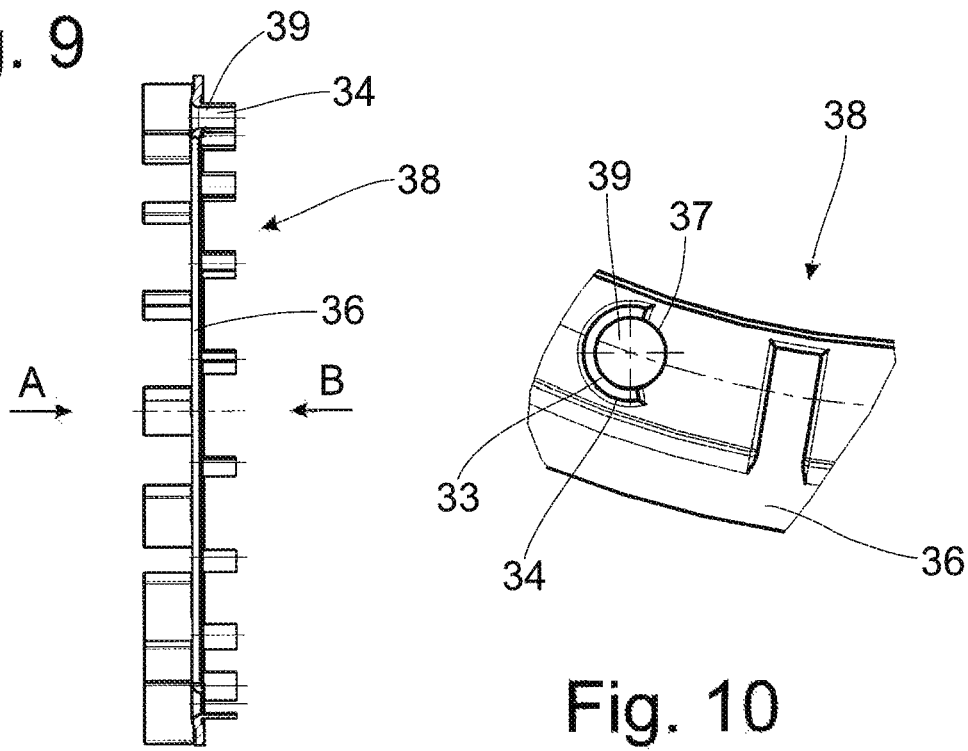
Fig. 10
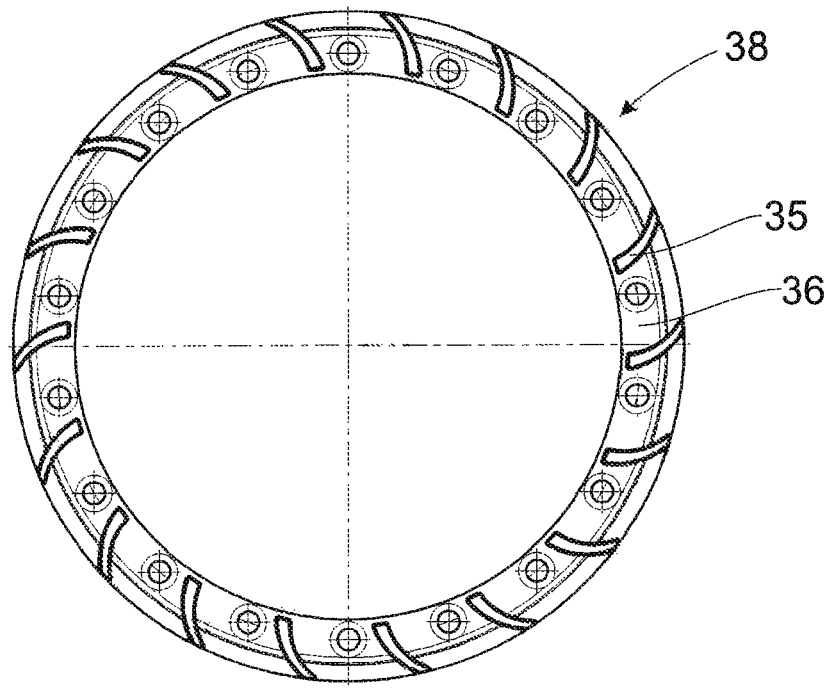
Fig. 11

Fig. 17
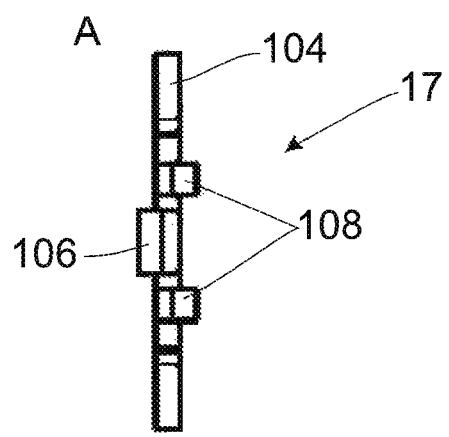
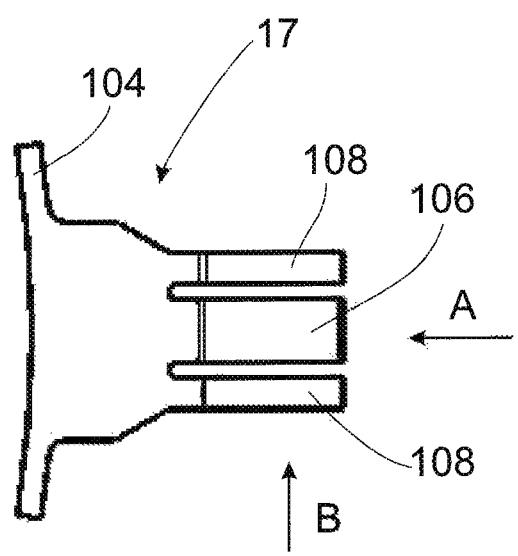
Fig. 16
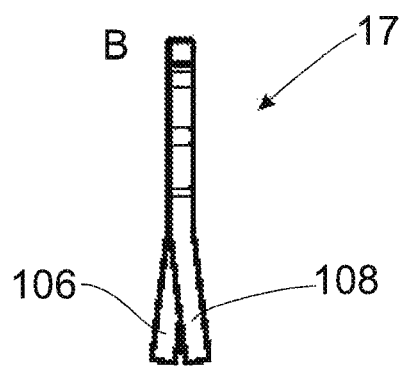
Fig. 18

COUPLING ARRANGEMENT FOR THE POWERTRAIN OF A VEHICLE

BACKGROUND OF THE INVENTION

1. Field of the Invention

The present invention is directed to a coupling arrangement for the powertrain of a vehicle with a clutch housing, provided with a feed arrangement for feed medium contained in the clutch housing and with a clutch mechanism, wherein the clutch device has input-side clutch units communicating with an input-side clutch unit carrier which is connected so as to be fixed with respect to rotation relative to the clutch housing, output-side clutch units communicating with an output-side clutch unit carrier which is connected so as to be fixed with respect to rotation relative to a driven end, and a pressing device through which an operative connection between the input-side clutch units and the output-side clutch units can be produced or cancelled, and wherein the input-side clutch unit carrier is part of the feed arrangement.

2. Background of the Invention

A coupling arrangement of this type is known from US2015008089A1. The input-side clutch unit carrier is fastened to a housing cover of the clutch housing and has an axial toothing at which the input-side clutch units are received so as to be fixed with respect to relative rotation. In a second function, the axial toothing serves as feed device for the feed medium contained in the clutch housing so that the input-side clutch unit carrier also acts as feed arrangement for this feed medium. Further, an energy storage arrangement which acts upon the pressing device is provided at the input-side clutch unit carrier, and the pressing device can be acted upon through the energy storage arrangement in direction facing away from the clutch units.

Output-side clutch units are provided axially between the input-side clutch units or axially between an input-side clutch unit and a further constructional unit such as the housing cover of the clutch housing, for example. These output-side clutch units are operatively connected to the output-side clutch unit carrier and a damping device with a driven end formed by a damping device hub.

While it is true that constructional units are obviated by forming the input-side clutch unit carrier as feed arrangement and also as energy storage arrangement such that it exceeds its actual function, the input-side clutch unit carrier is complicated and therefore expensive to produce because of its highly complex construction.

It is therefore an object of the present invention to provide a coupling arrangement such that a good through-flow through the clutch units is ensured along with advantageous manufacture.

SUMMARY OF THE INVENTION

This object is met in that a coupling arrangement for the powertrain of a vehicle provided with a clutch housing is provided with a feed arrangement for feed medium contained in the clutch housing and with a clutch mechanism, wherein the clutch device has input-side clutch units communicating with an input-side clutch unit carrier which is connected so as to be fixed with respect to rotation relative to the clutch housing, output-side clutch units communicating with an output-side clutch unit carrier which is connected so as to be fixed with respect to rotation relative to a driven end, and a pressing device through which an operative connection between the input-side clutch units and the output-side clutch units can be produced or cancelled, and wherein the input-side clutch unit carrier is part of the feed arrangement.

In particular, the feed arrangement has a feed device which is associated with the input-side clutch unit carrier and which is connected to the input-side clutch unit carrier and/or to the pressing device so as to be fixed with respect to relative rotation.

Since the input-side clutch unit carrier is part of the feed arrangement and the feed device is merely associated with the input-side clutch unit carrier, the feed arrangement has at least two constructional units, namely, the input-side clutch unit carrier on the one hand and the feed device on the other hand. Accordingly, the input-side clutch unit carrier and the feed device remain independent constructional units and can be optimized for the intended use in each instance with respect to constructional configuration as well as with respect to the selection of material, specifically as regards function but also with respect to the cost situation, namely, for the input-side clutch unit carrier and for the feed device. While metal, for example, is preferably used as material for the input-side clutch unit carrier particularly so that the area receiving the clutch units in a rotationally locked manner are constructed so as to be as wear-resistant as possible, it can be useful to produce the feed device from plastic so that the feed device is inexpensive and low-noise in operation. In particular, the feed device can be produced as a plastic injection-molded part. Alternatively, it may be useful to construct the feed device as a metal die-cast part or as sintered part.

The feed device preferably has a driving arrangement which is responsible for connecting the feed device to the input-side clutch unit carrier and/or to the pressing device so as to be fixed with respect to relative rotation. Since the input-side clutch unit carrier is fixed with respect to rotation relative to the clutch housing, the feed device and/or the pressing device are connected to the clutch housing so as to be fixed with respect to rotation relative to it because of the connection produced by the driving arrangement. Consequently, during rotation of the clutch housing around a central axis, the input-side clutch unit carrier and the feed device and/or the pressing device are guided so as to experience the same movement. In contrast, the output-side clutch unit carrier and therefore the output-side clutch units follow in an identically moving manner with a rotation of the driven end so that during pull operation, i.e., at a higher speed on the input side compared to a speed on the output side, a pressure gradient is generated in the clutch housing as a result of which feed medium contained in the clutch housing is sucked into the feed arrangement and conveyed radially outward from there. When the clutch units of the clutch mechanism are arranged radially outwardly of the feed arrangement, the feed medium is conveyed through the feed arrangement directly to the clutch units, where friction heat occurs during relative rotational movement. Therefore, the feed medium is made capable of intensively cooling the clutch units. The return movement of the flow radially inward then takes place on the side of the output-side clutch unit carrier, and a feed brake which further brakes the feed medium on the output side and therefore further improves the feed action of the feed arrangement can be additionally associated with this clutch unit carrier. This can be advantageous particularly in an operating mode in which there is an especially high speed differential between clutch housing and output, i.e., substantially when the vehicle is stationary or during slow starting.

The required flow can be achieved in a particularly simple manner when the driving arrangement of the feed device has at least one flow passage which extends into a corresponding cutout of the input-side clutch unit carrier and/or pressing device for the rotationally locked connection of the feed device to the input-side clutch unit carrier and/or the pressing device, particularly preferably while preserving a positive engagement. Based on this construction, a flow passage which is necessary in any case is utilized for a second function, namely, to connect the input-side clutch unit carrier to the feed device and/or to the pressing device so as to be fixed with respect to relative rotation. Further, the flow passage is located exactly at that location at which the feed arrangement, by reason of its function, provides for the feed action of the feed medium.

In a particularly preferred manner, the feed device is formed with a support which receives the driving arrangement at a side facing the input-side clutch unit carrier and which has a blading influencing the movement of the feed medium at a side remote of the driving arrangement. This results in a constructional unit that is dimensionally stable due to the support. Owing to the arrangement of the driving arrangement and the blading on different sides of the support, in addition to the functional separation, there is also an arrangement of these devices in different installation spaces. This type of configuration of the feed device is especially advantageous when this feed device is implemented as plastic injection-molded part, die-cast metal part or sintered part.

Particularly when the feed device is constructed with a support, the feed device can be utilized as centering means for at least one disconnecting device for clutch units. To this end, the disconnecting device acts on clutch units which are adjacent to one another so that these clutch units are acted upon by axial forces in directions facing away from one another. This results in the following advantages: When the clutch mechanism is engaged, i.e., when the input-side clutch units are at least partially brought into operative connection with the output-side clutch units by introducing an axial force via the pressing device, a positive pressure must be built up on the side of the pressing device remote of the clutch units in order to displace the pressing device axially in the direction of the clutch units and accordingly to guide the above-mentioned axial force to the clutch units. This pressure gradient is overlaid not only by friction influences which become noticeable in particular when the pressing device begins to move, but also by tolerance influences, e.g., variations in thickness in the relevant clutch units, particularly in the immediate surrounding area of the pressing device, which can cause an uncoordinated movement in the direction of the clutch units. The effect of the above-mentioned influences can be at least reduced when the engagement of the clutch mechanism takes place against the action of an energy storage which, in the case of the disconnecting device, is formed by the disconnecting elements which operate between adjacent clutch units. Since the disconnecting elements apply axial forces to the adjacent clutch units in directions facing away from each other, the pressing device must also overcome additional resistance built up by the disconnecting device during engagement of the clutch mechanism. Therefore, in a particularly preferred manner the disconnecting device should have a suitable force-travel characteristic. Tolerance-induced bucking during starting is effectively prevented in this way.

When the clutch mechanism is disengaged, i.e., when the operative connection between the input-side clutch units and the output-side clutch units is at least partially cancelled by reducing the pressing force exerted by the pressing device, a positive pressure must be built up on the side of the pressing device facing the clutch units in order to displace the pressing device in direction facing away axially from the clutch units and, therefore, to reduce or even completely eliminate the above-mentioned axial force on the clutch units. If in so doing the clutch units are not completely disengaged from one another, it can be assumed that there would loss-promoting drag torques between the clutch units. Also in this respect, there is an advantageous effect of the disconnecting device in that the latter acts on the adjacent clutch units with axial forces in directions facing away from each other and accordingly completely disengages them.

The disconnecting device cooperates very advantageously with the feed device in particular when at least one of the two devices is at least substantially annular and surrounds a central axis of the clutch housing.

In a preferred configuration of the input-side clutch unit carrier, the latter at least partially encloses at least the feed device, but possibly also the disconnecting device. As a result of this nested mode of construction, the entire constructional unit comprising input-side clutch unit carrier, feed device and possibly disconnecting device can be formed compactly overall. The input-side clutch unit carrier is accordingly allotted the function of a housing of the feed arrangement receiving the feed device. In order that a pressure chamber which is provided axially between the housing cover of the clutch housing and the pressing device can be separated in a pressure-tight manner from a cooling chamber provided at the opposite side of the pressing device, it is provided to use either the input-side clutch unit carrier or the pressing device for receiving a seal which is operative relative to the other respective constructional unit, namely, the input-side clutch unit carrier or pressing device. Insofar as the pressing device is connected via the feed device to the input-side clutch unit carrier so as to be fixed with respect to rotation relative to it, there is no relative rotational movement between the seal and the structural component part to which the seal is operatively connected. Accordingly, wear of the seal is limited to phases in which the pressing device undergoes an axial displacement for engaging or disengaging the clutch mechanism.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be explained more fully with reference to the drawings in which:

FIG. 3 is a detail of the input-side clutch unit carrier shown in FIG. 1 or FIG. 2 as individual component part, in longitudinal section;

FIG. 4 is like FIG. 3, but with a spatial representation of the input-side clutch unit carrier;

FIG. 9 is like FIG. 5, but with differently shape blading and different flow passages;

FIG. 10 is a segment of the feed device from viewing direction A in FIG. 9;

FIG. 11 is the feed device from viewing direction A in FIG. 9;

FIG. 16 is a disconnecting device with ring-segment-shaped support part;

FIG. 17 is the disconnecting device from FIG. 16 in viewing direction A in FIG. 16; and FIG. 18 is the disconnecting device from FIG. 16 in viewing direction B in FIG. 16.

DETAILED DESCRIPTION OF THE PRESENTLY PREFERRED EMBODIMENTS

Figure 1:
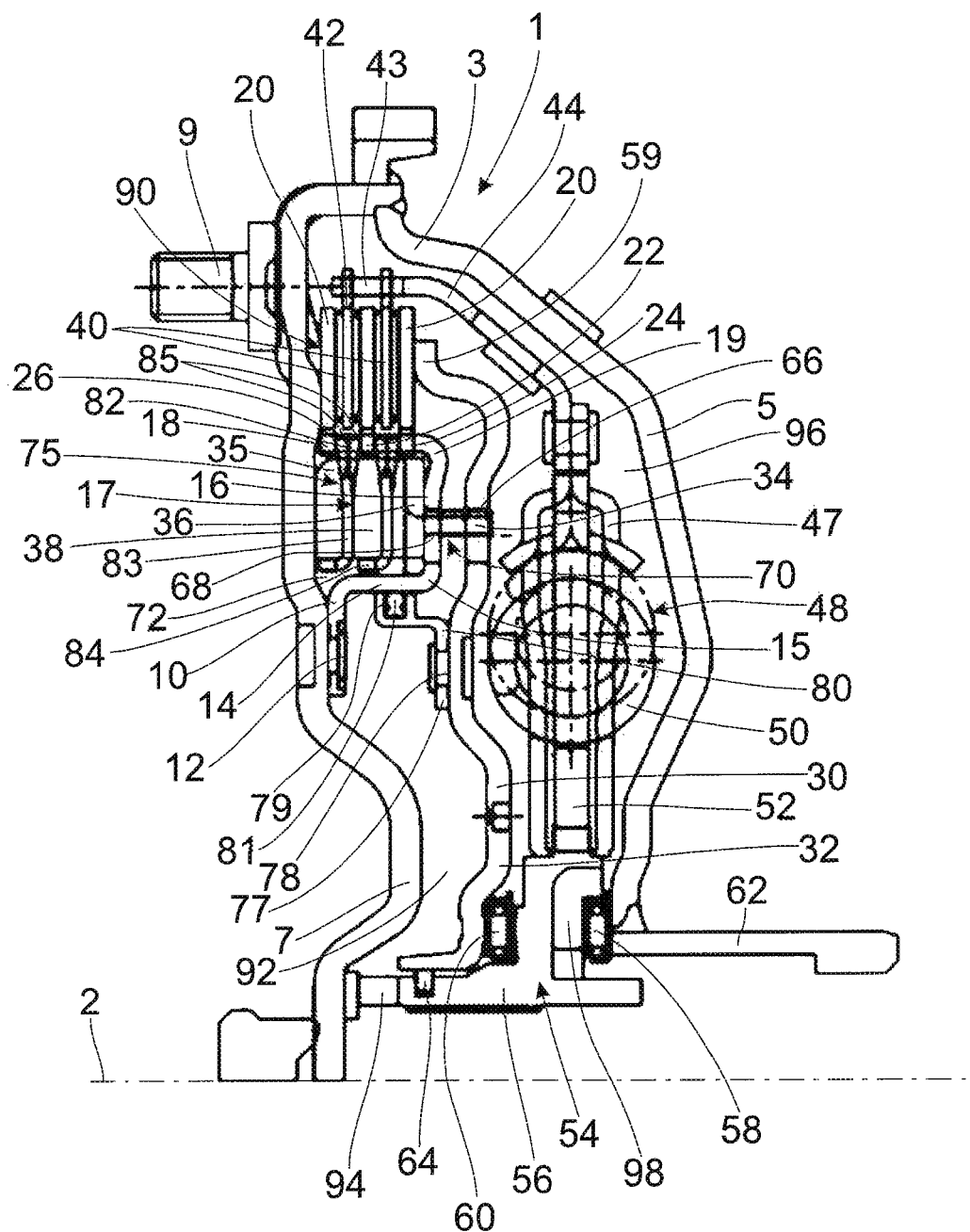
FIG. 1 is a sectional view of a coupling arrangement having a clutch mechanism with input-side clutch units and output-side clutch units and with a pressing device and a feed arrangement with a feed device and with a disconnecting device.

FIG. 1 shows a coupling arrangement 1 provided for the powertrain of a vehicle with a clutch housing 3 which is rotatable around a central axis 2 comprises a housing shell 5 and a housing cover 7 and encloses a wet space containing feed medium, for example, oil. As is shown, for example, in DE 32 22 119 C1, FIG. 1, the clutch housing 3 can be fastened to a crankshaft in an internal combustion engine by means of a driver disk and, to this end, has threaded pin 9 in the radially outer area of the housing cover 7 on the side thereof remote of the wet space.

Figure 2:
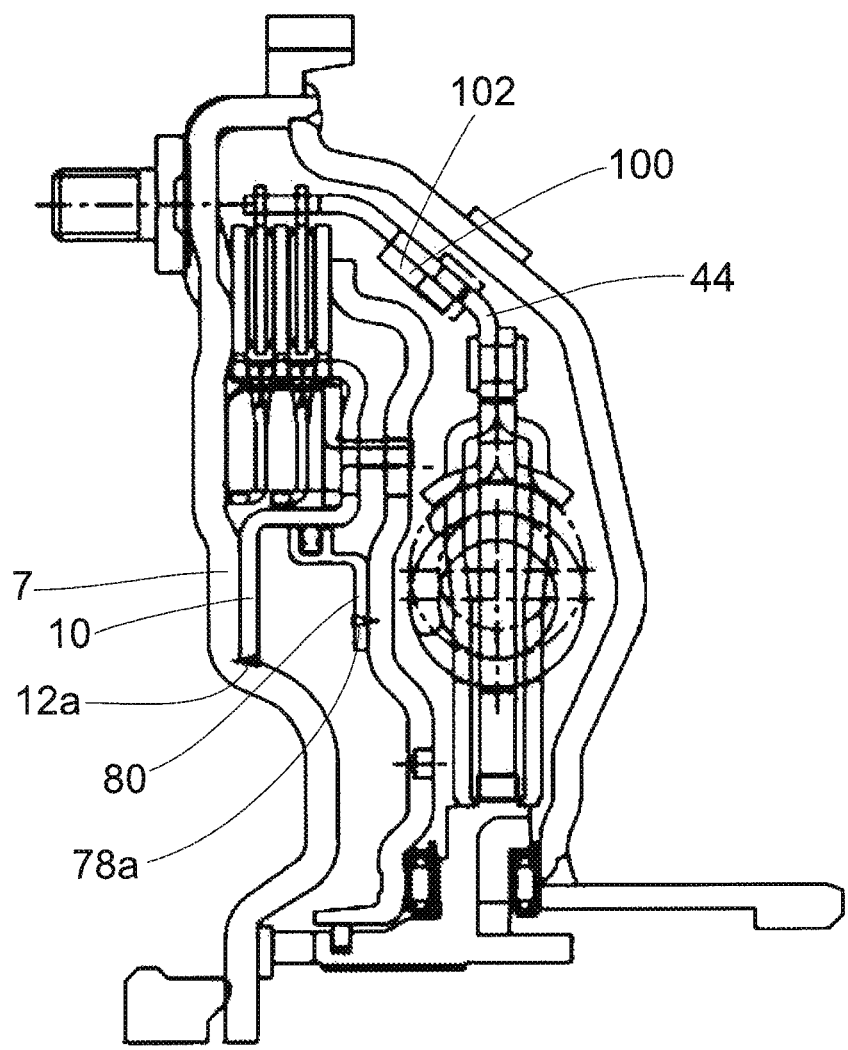
FIG. 2 is like FIG. 1, but with a different fastening of an input-side clutch unit carrier to a housing cover and with a seal at the pressing device.

An input-side clutch unit carrier 10 is fastened in the wet space of the clutch housing 3 at the housing cover 7 thereof, for example, by means of a push-through rivet 12 as is shown in FIG. 1 or by means of a weld seam 12a as is shown in FIG. 2. The input-side clutch unit carrier 10 which is also shown as a detail in FIGS. 3 and 4 extends radially outwardly of the push-through rivet 12 initially with a radially inner leg 14 in direction of the housing shell 5 and passes by means of a first bend 15 into a radial connection 16 to a radially outer leg 18. The radially outer leg 18 protrudes from the radial connection 16 by means of a second bend 19 and runs in direction of the housing cover 7.

In order to receive input-side clutch units 20 so as to be secured against rotation but displaceable, the radially outer leg 18 of the input-side clutch unit carrier 10 has in circumferential direction a plurality of cutouts 22 which are open at their ends facing the housing cover 7, while they terminate in direction of the second bend 19 at a limit of the radially outer leg 18 acting as stop 24. The above-mentioned input-side clutch units 20 extend with radially inwardly facing radial projections 26 into the cutouts 22 of the input-side clutch unit carrier 10, and the input-side clutch unit 20 at the greatest distance from the housing cover 7 can be axially supported at the stop 24. A pressing device 30 in the form of a clutch piston 32 can be brought into contact with this input-side clutch unit 20.

An output-side clutch unit 40 extends in each instance axially between two input-side clutch units 20. The output-side clutch units 40 have radially outwardly facing radial projections 42 by which they engage in cutouts 43 of an output-side clutch unit carrier 44 so as to be secured against rotation but so as to be axially displaceable.

While the input-side clutch units 20 are formed in each instance by steel disks, the output side clutch units 40 have friction linings on both sides of friction lining carriers. These friction linings can be formed with grooves for the circulation of feed medium.

The output-side clutch unit carrier 44 acts as input 47 of a torsional vibration damper 48, this input 47 being connected via an energy storage unit 50 to an output 52 of the torsional vibration damper 48, which output 52 is fixed with respect to rotation relative to a torsional vibration damper hub 56 serving as driven end 54.

The torsional vibration damper hub 56 is received axially between two thrust bearings 58, 60, one thrust bearing 58 being provided between the torsional vibration damper hub 56 and a housing hub 62 of the clutch housing 3 and one thrust bearing 60 being provided between the torsional vibration damper hub 56 and the clutch piston 32 of the pressing device 30.

The clutch piston 32 of the pressing device 30 is arranged at its radial inner side via a seal 64 on the torsional vibration damper hub 56 so as to be axially displaceable and rotatable relative thereto. In the radially outer region, the clutch piston 32 of the pressing device 30 is formed with a projection 59 which faces in direction of the clutch units 20, 40 and via which the pressing device 30 can be brought into operative connection with the adjacent input-side clutch unit 20 during the engaging movement of the pressing device 30.

Radially inwardly of the projection 59, the clutch piston 32 of the pressing device 30 is provided with cutouts 66, and a flow passage 34 which is at least substantially tubular is received in each instance in one of these cutouts 66 so as to be fixed with respect to rotation but axially displaceable relative to it. Further, this flow passage 34 penetrates cutouts 68 in the input-side clutch unit carrier 10 and opens into a support 36 of a feed device 38 which is also shown as detail in FIGS. 5 to 7. The flow passages 34, one of which is shown in an enlarged view as detail Z in FIG. 8, are received in the cutouts 68 of the input-side clutch unit carrier 10 so as to be fixed with respect to rotation relative to it so that the feed device 38 is connected via flow passages 34 to the input-side clutch unit carrier 10 on the one hand and to the pressing device 30 on the other hand so as to be fixed with respect to relative rotation. Therefore, the flow passages 34 act as driving arrangement 70 of the feed device 38. The feed device 38 is advantageously produced as plastic injection-molded part.

Figure 5:
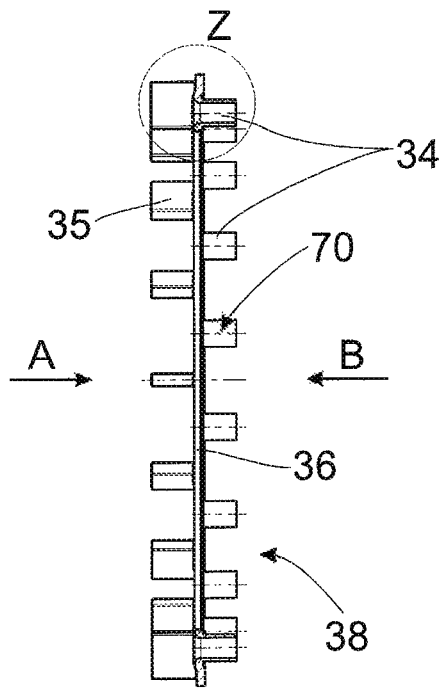
FIG. 5 is a detail of the feed device shown in FIG. 1 or FIG. 2, in longitudinal section.
Figure 6:
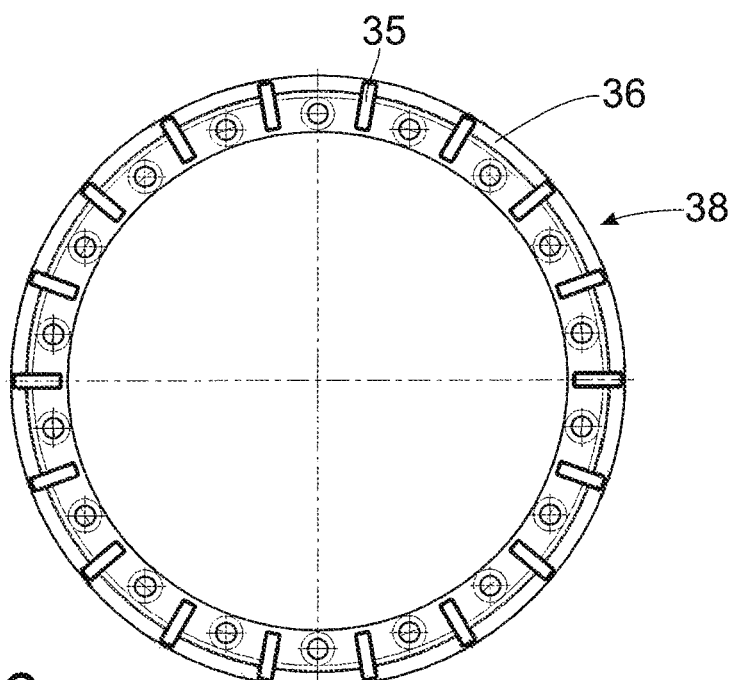
FIG. 6 is the feed device from viewing direction A in FIG. 5.

On the side of the support 36 remote of the flow passages 34, the feed device 38 has a blading 35 (FIGS. 5, 6 and 9, 11) which, depending on the required flow conditions in the clutch housing 3, runs between its respective radially inner end and its respective radially outer end either at least substantially linearly as is shown in FIGS. 5 and 6 or has a curvature as is shown in FIGS. 9 and 11.

Figure 7:
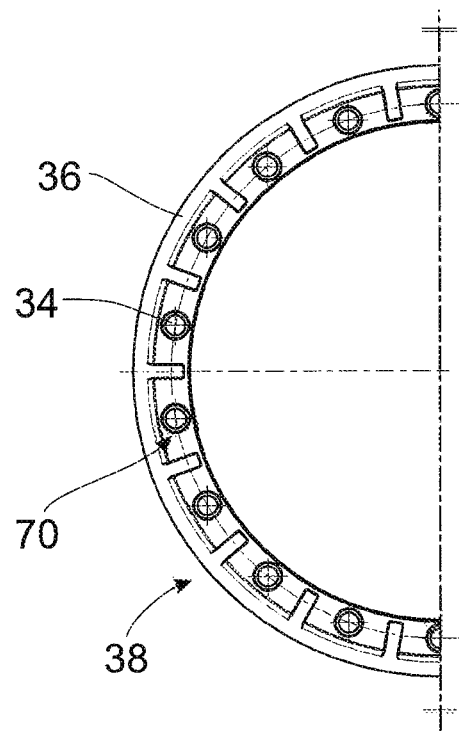
FIG. 7 is the feed device from viewing direction B in FIG. 5.
Figure 8:
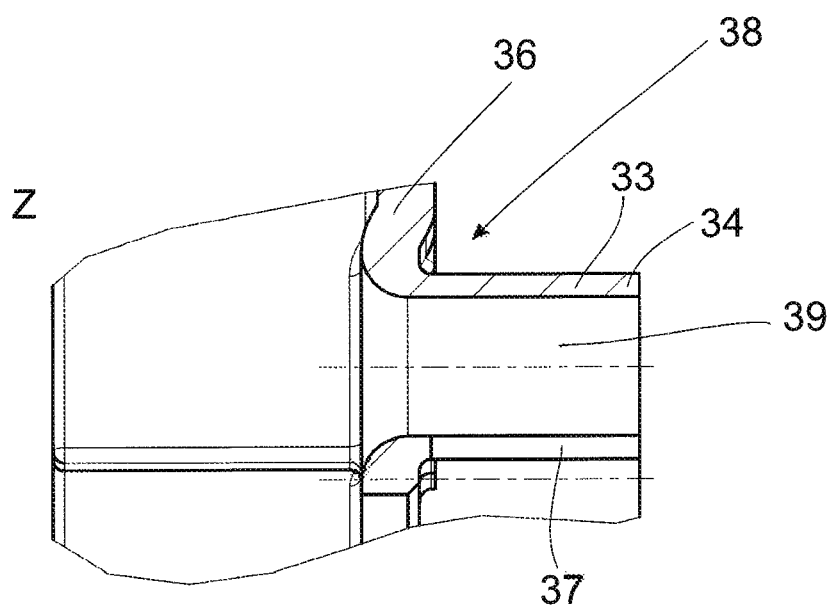
FIG. 8 is a detail of portion Z in FIG. 5
Figures 12, 13:
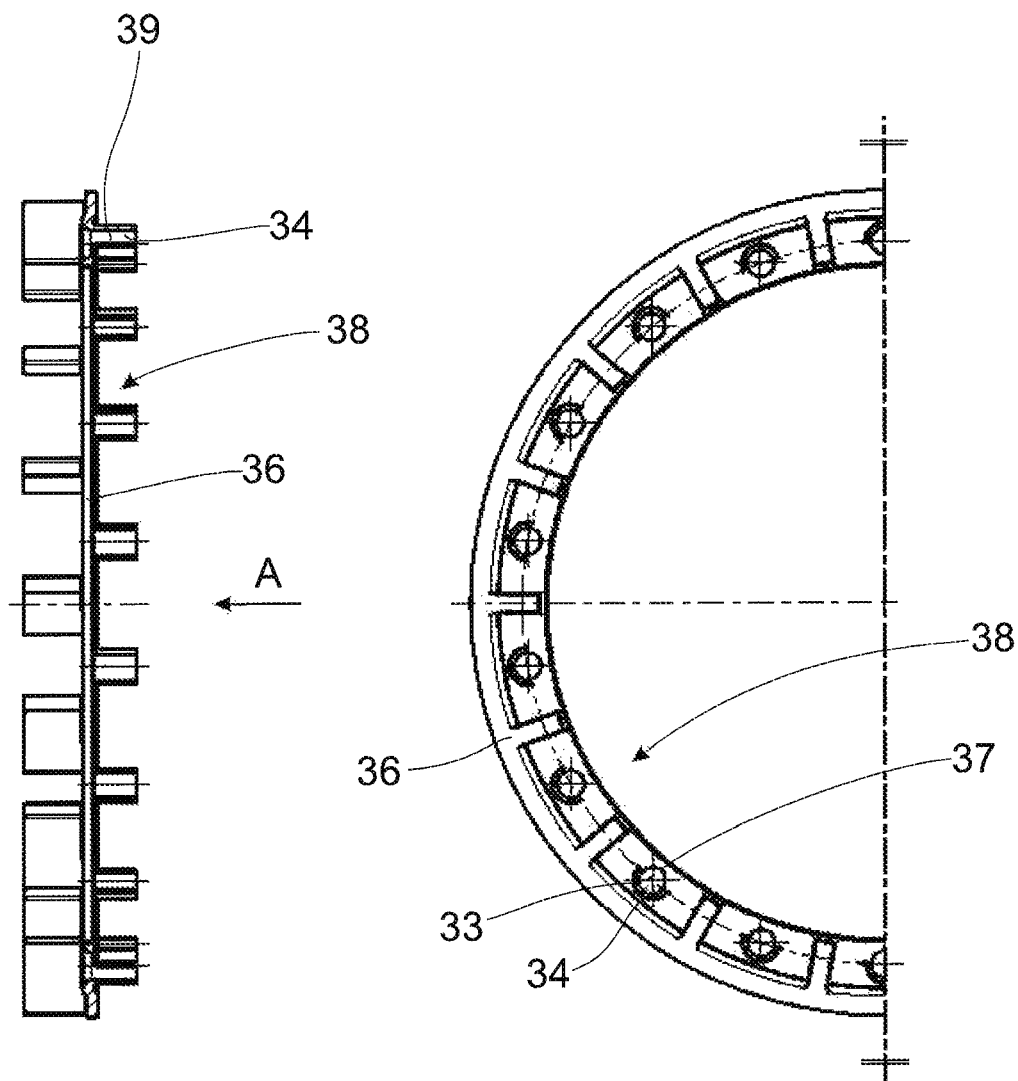
FIG. 12 is like FIG. 5, but with differently shaped flow passages.
FIG. 13 is the feed device from viewing direction A in FIG. 12.

As is shown in FIGS. 5 to 7, the flow passages 34 can be formed in each instance as pipes with closed pipe areas 33 at their circumference. However, it is also conceivable to form the flow passages 34 with partial openings 37 at their circumferences as is shown in FIGS. 9 and 10 and FIGS. 12 and 13 in conjunction with FIG. 8. These partial openings 37 can be provided at any location of the respective pipe. Referring to FIGS. 9 and 10, the dividing line between the closed pipe area 33 and the respective partial opening 37 extends at least substantially radially, whereas in FIGS. 12 and 13 it extends at least substantially parallel to an imaginary tangent. Regardless of this, the pipes each have a passage 39 for feed medium.

As can be seen clearly from FIG. 1, the input-side clutch unit carrier 10 is at least substantially U-shaped in cross section owing to the above-described arrangement of radially inner leg 14, radial connection 16 and radially outer leg 18 and accordingly, together with the housing cover 7, defines a space 72 which serves to receive the feed device 38 and can also be used to receive a disconnecting device 17. The input-side clutch unit carrier 10 and the feed device 38 which is received in space 72 make up part of a feed arrangement 75 whose function will be described more fully hereinafter.

A seal receptacle 77 is fastened to the clutch piston 32 of the pressing device 30 on the side facing the housing cover 7, for example, by means of a push-through rivet 78 as is shown in FIG. 1 or by means of welding 78a as is shown in FIG. 2. The seal receptacle 77 receives a seal 81 in a recess 79 defined in a U-shaped manner, which seal 81 contacts the side of the radially inner leg 14 of the input-side clutch unit carrier 10 remote of the feed device 38. Like seal 81, the seal receptacle 77 is part of a seal 80 acting between the input-side clutch unit carrier 10 and the pressing device 30.

Figures 14, 15:
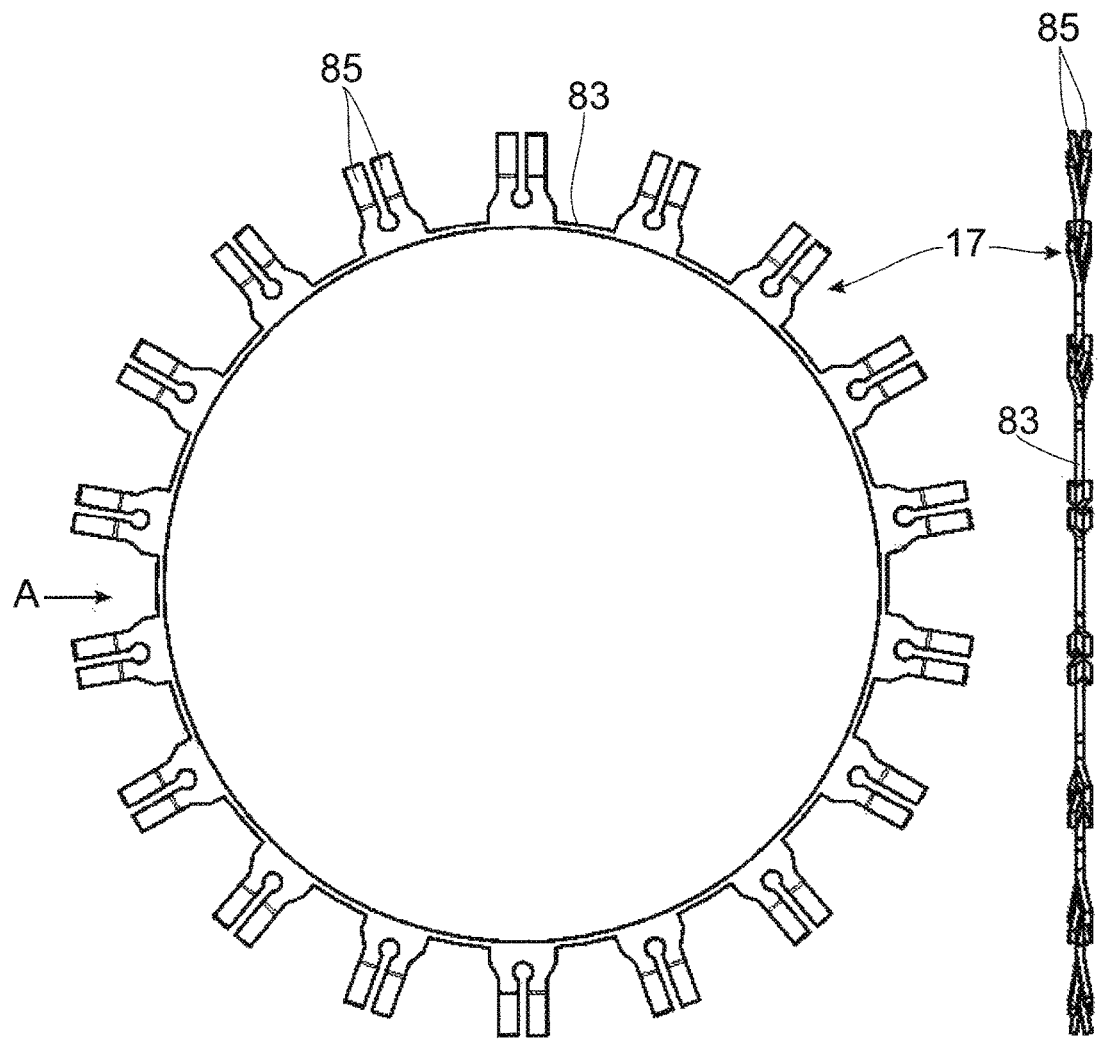
FIG. 14 is a detail of the disconnecting device shown in FIG. 1 or FIG. 2 in a top view with annular support part.
FIG. 15 is a disconnecting device as in FIG. 14 in viewing direction A in FIG. 14.

As can be seen more clearly in FIGS. 14 and 15, the disconnecting device 17 has disconnecting units 82 with a support part 83 annularly enclosing the central axis 2. Disconnecting elements 85 in the form of spring arms which are provided in pairs in circumferential direction and are intertwined project radially outward from the support part 83. Owing to the intertwining, one disconnecting element 85 of every pair of disconnecting elements projects in direction of the housing cover 7 with respect to the axial plane of the support part 83, while the other disconnecting element 85 projects in direction of the housing shell 5. Accordingly, the disconnecting elements 85 have the effect of pressing apart the input-side clutch units 20 between which they extend axially.

Since all pairs of disconnecting elements in a disconnecting unit 82 fit on a common support part 83, torques which could lead to a tilting movement of the disconnecting device 17 relative to the input-side clutch units 20 cancel each other out. This would not be the case if the respective disconnecting unit 82 had individual partial support segments in circumferential direction instead of a common support part 83. In order to prevent unwanted tilting movements when using a disconnecting device 17 with individual partial support segments 104, the latter are constructed as shown in FIGS. 16 to 18 such that, viewed in circumferential direction, there are associated with a disconnecting element 106 which faces medially in a first axial direction two disconnecting elements 108 which are provided on both sides of this disconnecting element 106 in circumferential direction and which face in a second axial direction opposite the first axial direction. The axial force exerted by the two disconnecting elements 108 is preferably at least substantially equal to the axial force exerted by the circumferentially medial disconnecting element 106.

As shown in FIG. 1, the disconnecting units 82 can be centered at the radial inner side of the feed device 38, particularly at the blading 35 thereof. To this end, the support part 83 can have a fold 84 extending at least substantially in axial direction. The pair of disconnecting elements have a distance from one another in circumferential direction that is determined by the circumferential spacing of the individual blades of the blading 35 of the feed device 38.

Like the clutch unit carriers 10 and 44, the pressing device 30 and possibly the disconnecting device 17, the clutch units 20 and 40 are part of a clutch mechanism 90.

A pressure chamber 92 which is supplied with feed medium proceeding from the area of the central axis 2 via a pressure connection with which is associated a passage 94 provided in the torsional vibration damper hub 56 adjacent to the housing cover 7 is provided axially between the housing cover 7 and the pressing device 30. A cooling chamber 96 which at least partially encloses, inter alia, the clutch units 20 and 40, clutch unit carriers 10 and 44, disconnecting device 17 and torsional vibration damper 48 is located on the other side of the pressing device 30. The supplying of the cooling chamber 96 with feed medium is carried out via a pressure connection with which is associated a passage 98 which is provided in the torsional vibration damper hub 56 adjacent to the housing hub 62. The seal 80 is provided to ensure an adjusted pressure gradient between the pressure chamber 92 and the cooling chamber 96.

In order to engage the clutch mechanism 90, a positive pressure is adjusted in the cooling chamber 96 in that feed medium is guided into the cooling chamber 96 through the pressure connection which is associated with the passage 98 adjacent to the housing hub 62 and which is referred to hereinafter as first pressure connection. At the same time, feed medium is released from the pressure chamber 92 via the pressure connection which is associated with the passage 94 adjacent to the housing cover 7 and which is designated hereinafter as second pressure connection. The clutch piston 32 of the pressing device 30 is accordingly displaced in direction of the clutch units 20 and 40 to come in contact initially with the input-side clutch unit 20 adjacent to the pressing element 30 and subsequently to transmit an axial force by means of which the clutch units 20 and 40 are brought into operative connection with one another against the action of the spring arms 85 of the disconnecting device 17 which extend axially between the clutch units 20 and are intertwined. During this movement of the pressing device 30, the flow passages 34 of the driving arrangement 70 of the feed device 38 are displaced axially relative to the cutouts 66 of the pressing device 30 which receive these flow passages 34, and the seal 80 also undergoes an axial displacement relative to the input-side clutch unit carrier 10.

To disengage the clutch 90, a positive pressure is adjusted in the pressure chamber 92 in that feed medium is introduced into the pressure chamber 92 through the second pressure connection which is associated with the passage 94 adjacent to the housing cover 7. At the same time, feed medium is released from the cooling chamber 96 via the first pressure connection which is associated with passage 98 which is adjacent to housing hub 62. The clutch piston 32 of the pressing device 30 is accordingly displaced in direction facing away from the clutch units 20 and 40 so as initially to reduce the axial force transmitted to the clutch units 20 and 40 with reinforcement of the spring arms 85 of the disconnecting device 17 which engage axially between the clutch units 20 and are interlaced with one another and, finally, to lift from the input-side clutch 20 adjacent to the pressing element 30. Also, during this movement of the pressing device 30, the flow passages 94 of the driving arrangement 70 of the feed device 38 are displaced axially relative to the cutouts 66 of the pressing device 30 which receive these flow passages 34, and the seal 80 also undergoes an axial displacement relative to the input-side clutch unit carrier 10.

As has already been mentioned, the flow passages 34 are received so as to be fixed with respect to relative rotation at the support 36 of the feed device 38 and, therefore, so as to be fixed with respect to relative rotation at the feed device 38, but also so as to be fixed with respect to relative rotation in the cutouts 38 of the input-side clutch unit carrier 10. Since the input-side clutch unit carrier 10 is in turn received so as to be fixed with respect to relative rotation at the housing cover 7 and, therefore, at the clutch housing 3, the feed device 38 tracks the movement of the clutch housing 3 by means of the flow passages 34, i.e., at input speed. On the other hand, in the area in which flow passages 34 of the feed device 38 open into the cutouts 66 of the pressing device 30, the output-side clutch units 40 rotate together with the output-side clutch unit carrier 44 and the torsional vibration damper 48, i.e., at the speed of the driven end 54 formed by the torsional vibration damper hub 56. Since the speed is higher at the clutch housing 3 than at the torsional vibration damper hub 56 as long as the clutch mechanism 90 is not yet completely engaged during the pull operation which is predominately present, the feed device 38 sucks feed medium out of the cooling chamber 96 via the flow passages 34. At the same time, the feed device 38 displaces feed medium radially outward into the extension area of the clutch units 20 and 40, where a cooling takes place in the contacting areas thereof. Proceeding from the clutch units 20 and 40, this feed medium arrives at least substantially back in the region of the cooling chamber 96 in which it can be sucked out again via the flow passages 34.

This internal flow circuit initiated by the feed arrangement 75 can be strengthened when there is a clear relative rotational movement between clutch housing 3 and driven end 54 when lugs 102 (FIG. 2) are provided in the output-side clutch unit carrier 44, which lugs 102 are produced by relief from the material of the output-side clutch unit carrier 44 and subsequent bending so that they protrude from the surface of the output-side clutch unit carrier 44 and project into the flow area of the feed medium and brake the feed medium. Accordingly, the lugs 102 act as a feed brake 100. A feed brake of this kind is particularly useful for starting the vehicle from a standstill because the speed of a drive unit such as an internal combustion engine is present at the clutch housing 3, while the speed at the driven end 54 is approximately zero at the commencement of starting.

The internal flow circuit initiated by the feed arrangement 75 is designed for a low idling torque when the vehicle is stationary at idling speed because the increase in the feed performance of the feed arrangement 75 is squared in proportion to speed. With increasing speed at the clutch housing 3 and attendant increased starting power loss at the clutch units 20 and 40, the conveying capacity of the feed medium increases advantageously according to a predetermined characteristic line for the feed arrangement 75.

Of course, fresh feed medium can be supplied from an external feed source to the internal flow circuit initiated by the feed arrangement 75 so that an efficient cooling can be maintained over the long term even under frictional load.

The internal flow circuit initiated by the feed arrangement 75 will end as soon as the clutch mechanism 90 is completely engaged and the speeds at the driven end 54 have equalized at least substantially with the speeds at the clutch housing 3.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A coupling arrangement (1) for the powertrain of a vehicle (1) comprising:
   a clutch housing (3);
   a feed arrangement (75) for feed medium contained in the clutch housing (3);
   an input-side clutch unit carrier (10) connected so as to be fixed with respect to rotation relative to the clutch housing (3);
   a clutch mechanism (90), wherein the clutch mechanism (90) comprising input-side clutch units (20) communicating with the input-side clutch unit carrier (10), an output-side clutch unit carrier (44) connected so as to be fixed with respect to rotation relative to a driven end (54), output-side clutch units (40) communicating with the output-side clutch unit carrier (44) and a pressing device (30) through which an operative connection between the input-side clutch units (20) and the output-side clutch units (40) can be produced or cancelled;
   wherein the input-side clutch unit carrier (10) is part of the feed arrangement (75), and the feed arrangement (75) further comprising a feed device (38) associated with the input-side clutch unit carrier (10) and which is connected to the input-side clutch unit carrier (10) and/or to the pressing device (30) so as to be fixed with respect to relative rotation; and
   additionally comprising at least one disconnecting device (17) for disconnecting the input-side from the output-side clutch units, and wherein the feed device (38) is constructed as a centering device for the at least one disconnecting device (17).

2. The coupling arrangement (1) according to claim 1, wherein the feed device (38) comprises a driving arrangement (70) for connecting the feed device (38) to the input-side clutch unit carrier (10) and/or to the pressing device (30) so as to be fixed with respect to relative rotation.

3. The coupling arrangement (1) according to claim 2, wherein the input-side clutch unit carrier (10) and/or the pressing device (30) comprise a cutout (66, 68), and the driving arrangement (70) has at least one flow passage (34) extending into the corresponding cutout (66, 68) of the input-side clutch unit carrier (10) and/or pressing device (30) for rotationally locking the feed device (38) to the input-side clutch unit carrier (10) and/or the pressing device (30).

4. The coupling arrangement (1) according to claim 3, wherein the at least one flow passage (34) extends into the corresponding cutout (66, 68) while preserving a positive engagement with the input-side clutch unit carrier (10) and/or pressing device (30).

5. The coupling arrangement (1) according to claim 2, wherein the feed device (38) includes a support (36) which comprises the driving arrangement (70) and a blading (35) for influencing the movement of the feed medium.

6. The coupling arrangement (1) according to claim 5, wherein the support (36) comprises the driving arrangement (70) at a side facing the input-side clutch unit carrier (10) and the blading (35) at a side remote of the driving arrangement (70).

7. The coupling arrangement (1) according to claim 1, wherein the disconnecting device (17) for the clutch units acts on clutch units which are adjacent to one another so that the adjacent clutch units are acted upon by axial forces in directions facing away from one another.

8. The coupling arrangement (1) according to claim 1, wherein at least one of the feed device (38) and the disconnecting device (17) is at least substantially annular and surrounds a central axis (2) of the clutch housing (3).

9. The coupling arrangement (1) according to claim 1, wherein the input-side clutch unit carrier (10) at least partially encloses the feed device (38).

10. The coupling arrangement (1) according to claim 1, wherein either the input-side clutch unit carrier (10) or the pressing device (30) is constructed for receiving a seal (80) which is operative relative to the other of the input-side clutch unit carrier (10) or pressing device (30).

11. The coupling arrangement (1) according to claim 1, wherein the output-side clutch unit carrier (44) comprises a feed brake (100) for slowing down the flow of feed medium.

12. The coupling arrangement (1) according to claim 1, wherein the feed device (38) is produced as a plastic injection-molded part, as a metal die casting or as a sintered part.

13. The coupling arrangement (1) according to claim 1, wherein the feed device (38) is arranged radially inside the respective clutch units (20, 40) of the clutch mechanism (90).

14. The coupling arrangement (1) according to claim 1, wherein the input-side clutch unit carrier (10) at least partially encloses the disconnecting device (7).

* * * * *